Figure 1:
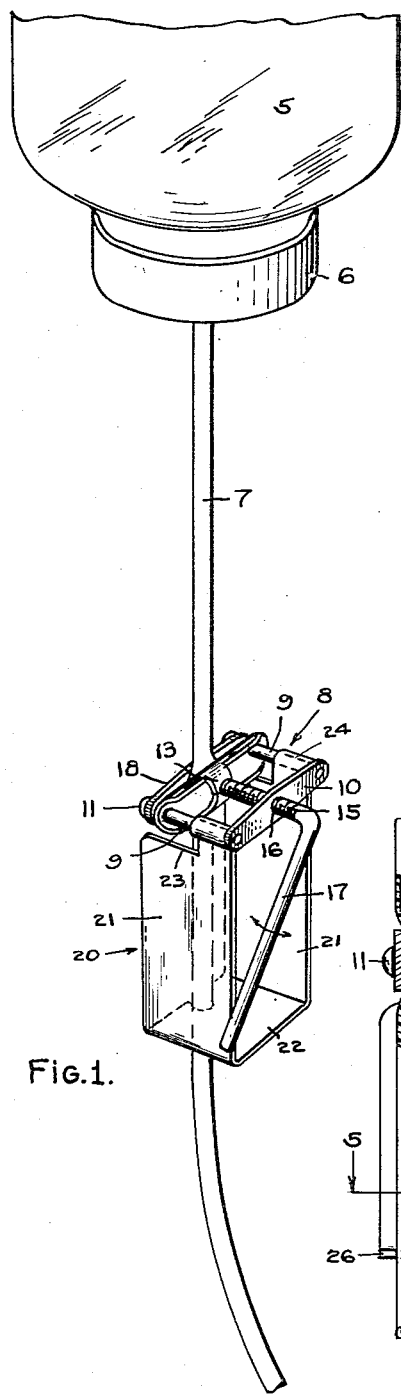

July 1, 1958 — T. B. RUSSELL ET AL — 2,841,358
FLEXIBLE TUBING PRECISION LIQUID FLOW CONTROLLER
Filed Nov. 26, 1956

INVENTORS
ROBERT C. BARTLETT
THEODORE B. RUSSELL,
BY James N. Gyles
ATTORNEY.

United States Patent Office 2,841,358
Patented July 1, 1958

2,841,358

FLEXIBLE TUBING PRECISION LIQUID FLOW CONTROLLER

Theodore B. Russell and Robert C. Bartlett, Miami, Fla.

Application November 26, 1956, Serial No. 624,302

1 Claim. (Cl. 251—8)

This invention relates to a clamp whereby to engage and progressively compress a flexible tubing for accurately controlling the flow of fluid through the tube for discharge at a predetermined rate.

The invention contemplates broadly a clamping device that is detachably engaged with a flexible tube such for instance, as a tube leading from a suspended source of medication such for instance as employed for infusions, transfusions or intravenous injections, and whereby to progressively compress the tube in a manner to determine a rate of discharge, such for instance as a predetermined number of drops to be discharged intravenously with respect to a person receiving the medication.

The invention further contemplates an adjustable clamping device that is quickly and easily engaged upon a compressible tube and that will be supported substantially parallel to the tube to prevent undue shifting of the clamp and whereby to facilitate the adjustment of the clamp by a single hand of the operator.

Clamping devices have heretofore been employed for controlling the flow of medication or the like for intravenous injection, but such clamps have been difficult to control and normally require the use of both hands of the operator in making the necessary adjustment to control the flow of fluid through the tube. The device of this invention relates to a clamping device that embodies a clamping head and a suspended frame that engages a predetermined length of the tube to prevent undue shifting and whereby the device may be held by one hand of the operator and manipulated by the fingers in a manner to control the flow of liquid in a precision manner, leaving the other hand of the operator free for such duties as may be necessary with respect to a person being treated. While the device has been primarily designed as a precision liquid flow controller, it will be apparent that the structure presented enables the use of the device with respect to any compressible tube where a predetermined flow is desired.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
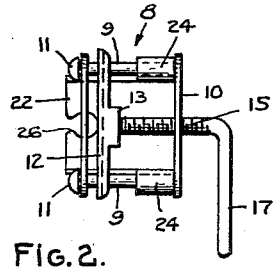
Figure 3:
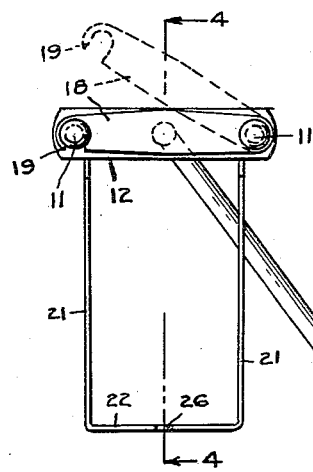
Figure 4:
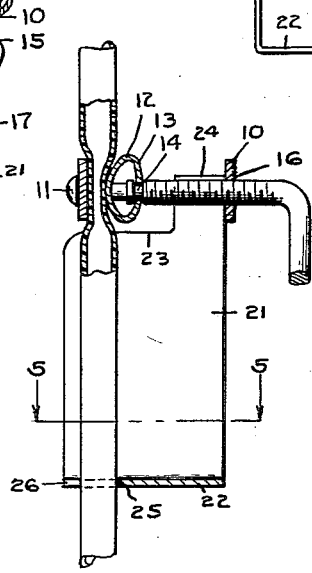
Figure 5:
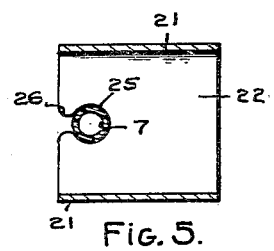

In the drawings:

Figure 1 is a perspective view illustrating generally a suspended source of fluid supply and a flow tube leading therefrom and showing the invention applied thereto, Figure 2 is a top plan view of the device, Figure 3 is a side elevation, parts being shown in dotted lines to illustrate the detachable means, Figure 4 is a vertical section taken substantially on line 4—4 of Figure 3, and Figure 5 is a horizontal section taken substantially on line 5—5 of Figure 4.

Referring specifically to the drawings, the numeral 5 designates a conventional glass fluid container that is normally suspended at an elevation relative to a person to be treated and whereby to dispose the container for a gravity feed of the fluid. The container 5 is provided with the conventional cap 6, having connected thereto in a conventional manner, a flexible and usually plastic tube 7. The tube 7, as is well known, is provided at its free end with a conventional hypodermic needle that is injected into the person at a desired point. Since various medications must be accurately controlled, there has been provided a clamping device, illustrated as a whole by the numeral 8.

The clamping device 8 embodies a pair of spaced apart rods 9 that are fixedly connected at one end to a cross-bar 10. The rods 9 at their opposite ends are provided with enlarged heads 11. Shiftable upon the rods 9 is a semi-cylindrical clamping bar 12, that is apertured at its opposite ends for freely sliding movement upon the rods. The bar 12 has been transversely curved to provide a compressive engagement upon the tube 7 to concentrate the clamping action at a relatively small area of the tube. The bar 12 intermediate its length is provided with integral and rearwardly bent tongues 13 that jointly engage a circumferential slot 14 formed within the end portion of a threaded adjusting screw 15 and whereby the screw 15 serves to move the bar 12 toward and from a clamping engagement with the tube 7. The screw 15 is threadedly engaged within an opening 16 formed in the bar 10 and extends rearwardly beyond the bar 16 where it is bent at a right angle to form a control handle 17. Also engaged with the rods 9 inwardly of the heads 11, is a shiftable cooperating clamping bar 18. The bar 18 at one end is apertured for permanent engagement with one rod 9, while its opposite end is notched at 19 whereby the bar 18 may be swung upwardly to permit of the engagement of the tube 7 against the bar 12. The free end of the bar 18 is held against lateral movement by its engagement over the opposite rod 9 and behind the adjacent head 11.

The clamp so far described is quickly and easily engaged with the tube 7 by rotating the screw 15 in a direction to cause the bar 12 to move in a direction toward the bar 10. The bar 18 is then swung upwardly, permitting the engagement of the tube 7 against the bar 12, after which the bar 18 is swung downwardly to engage its notched end 19 over its respective rod 9. The screw 15 is then rotated in an opposite direction by the handle 17, causing the bar 12 to move forwardly to clamp the tube 7 against the bar 18, compressing the tube and controlling the flow of fluid through the tube 7 to a higher degree of accuracy.

Means are provided to prevent undue swinging or shifting movement of the clamp device 8, since the tube 7 is obviously flexible, such means embodying a U-shape frame 20 having side walls 21 and a bottom wall 22. The side walls 21 adjacent their upper ends are cut away at 23 to provide clearance for the shifting movement of the bar 12. The upper terminal ends of the side walls 21 are bent to tubular form at 24 for fixed engagement upon the rods 9 and whereby the frame 20 is suspended and rigidly fixed with respect to the clamp. The bottom wall 22 is apertured at 25 and the aperture communicates with a relatively narrow notch 26 whereby the tube 7 may be forced inwardly of the bottom wall to engage the aperture 25, thus supporting the device upon the tube 7 in a manner to prevent undue swinging motion that would interfere with the manual operation of the clamp by a hand of the operator. The frame 20 also provides a means whereby the operator may grip the entire assembly and at the same time actuate the handle 17 for moving the clamping bar 12 to a point where a predetermined flow of the fluid is maintained.

In use, the clamping bar 12 is shifted to non-clamping position, after which the bar 18 is shifted upwardly and the clamp engaged over the tube, after which the bar 18 is swung downwardly to its operative position and the handle 17 then actuated to move the bar 12 in a manner to clamp the tube 7 against the bar 18. The tube 7 is then engaged with the bottom wall of the frame 20 by forcing it inwardly through the notch 26 to engage the aperture 25. The aperture 25 is of such size as to permit the tube to be fully engaged therein without distortion. The device is now supported against swinging movement with respect to the tube 7. With the hypodermic needle engaged into the arm or other portion of the body of the person being treated, the operator grasps the frame 20 in one hand and progressively moves the handle 17 in a direction to control the clamping bar 12 so as to accurately determine the number of drops of medication passing through the tube for discharge through the needle. It is important that the device be controlled by one hand of the operator, and this is possible since the operator by grasping the frame 20 then can manipulate his finger to shift the handle 7 progressively until the proper number of drops per minute are passing downwardly through the tube, thus leaving the other hand of the operator free for such duties as may be necessary with respect to the person being treated. The device may be quickly and easily removed from the tube 7, by first pulling the tube 7 outwardly from the aperture 25, then shifting the bar 12 toward the bar 10 to relieve pressure upon the bar 18, after which the bar 18 is swung upwardly and the device removed.

It will be apparent from the foregoing that a very simple and most practical means has been provided for compressing a flexible feed tube in a highly precision manner to control the flow of fluid. The device is quickly and easily engaged with the tube 7 and is just as easily removed therefrom and provides a very novel clamping device that is capable of operation with one hand. The parts are few and simple, strong, durable and most effective as a means to control the flow of medication when used for infusions, transfusions, intravenous injections or the like.

It is to be understood that the invention is not limited to the precise construction shown, but that changes are contemplated as readily fall within the spirit of the invention as shall be determined by the scope of the subjoined claim.

Having described our invention, what we claim as new and desire to secure by Letters Patent is:

A detachable and adjustable clamp for compressing a flexible feed tube to control the flow of fluid therethrough in a predetermined number of drops per minute, comprising a clamping head that includes a pair of spaced apart and connected guide rods, a clamping bar shiftable upon the rods, screw means for shifting the clamping bar, an elongated handle for actuating the screw, a cooperating clamping bar also supported upon the guide rods to be disposed parallel to and in opposed relation to the first named bar, the second named clamping bar being pivotally mounted on one guide rod and releasably engageable with the other guide rod whereby to dispose a tube to be compressed between the bars, an open hand grip carried by the guide rods and that depends below the clamping head, the hand grip having a bottom wall that is apertured and notched for embracing engagement with that portion of the tube that extends below the clamping head, the said tube to be compressed being held at spaced apart points by the clamp and the hand grip to prevent twisting of the device when the handle and screw are actuated, the said hand grip being an open U-shaped frame having parallel side walls and the apertured bottom wall, the side walls at their upper ends being formed tubular to engage upon and be suspended from the guide rods, the aperture of the bottom wall corresponding in diameter to the tube to be compressed, the said notch being cut through the bottom wall to communicate with the aperture and whereby the tube may be forced through the notch for detachable supporting engagement in the aperture.

References Cited in the file of this patent

UNITED STATES PATENTS

| | | |
|---|---|---|
| 715,429 | Seabury | Dec. 9, 1902 |
| 1,224,515 | Treacy | May 1, 1917 |
| 2,366,424 | Perry | Jan. 2, 1945 |
| 2,640,675 | Farris | June 2, 1953 |

FOREIGN PATENTS

| | | |
|---|---|---|
| 639,646 | Great Britain | of 1950 |
| 515,632 | Canada | of 1955 |